Patented July 20, 1943

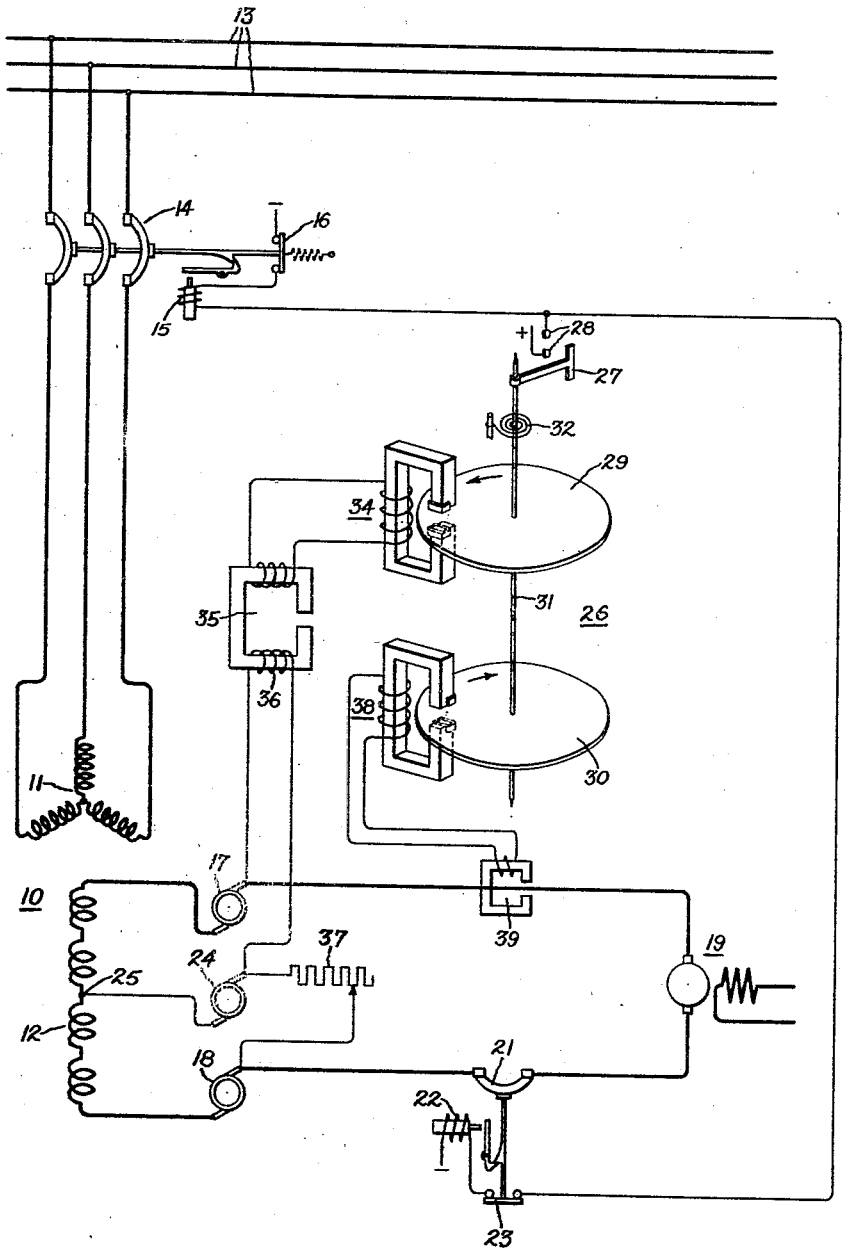

2,324,825

UNITED STATES PATENT OFFICE 2,324,825

PROTECTIVE SYSTEM

Selden B. Crary, Schenectady, N. Y., assignor to General Electric Company, a corporation of New York Application November 13, 1941, Serial No. 418,916

8 Claims. (Cl. 175—294)

My invention relates to protective systems and more particularly to systems for the protection of synchronous dynamoelectric machines against internal faults. Specifically, my invention is an improvement on United States Letters Patent 1,867,416 and 1,867,417, granted July 12, 1932, upon applications of E. G. Merrick and assigned to the same assignee as the present application.

Internal faults and particularly turn-to-turn faults in the armature winding which is usually the stator of synchronous dynamoelectric machines may often develop into serious faults unless removed in their incipient stages. Differential protective schemes have been used but the unbalance under external fault conditions in such machines is of such a magnitude that the sensitivity of such a system must be considerably reduced, whereby it is unable to protect against many incipient faults. The protective scheme suggested in the above-mentioned United States patents detects an internal fault, such as a turn-to-turn fault on the armature or stator winding of a synchronous dynamoelectric machine in response to the alternating-current voltage induced in a small portion of the direct-current field winding which is usually the rotor winding of a synchronous dynamoelectric machine. The magnitude of the alternating-current voltage appearing across this small portion of the field winding relative to the alternating-current voltage appearing across another portion of the field winding, such as the total field winding, as a result of the voltage induced by the movement of the field winding relative to the other winding of the synchronous dynamoelectric machine is utilized to operate an electroresponsive device or protective relay. As long as there are no dissymmetries such as non-uniform air gap or short-circuited turns in the field or rotor winding, the protective schemes covered by the above-mentioned Letters Patent operate satisfactorily. However, I have found that, when a shorted turn exists on the field or rotor winding of a synchronous dynamoelectric machine, very high voltages would appear across the portion of the field winding, which includes the shorted turn upon the occurrence of an external fault and would cause undesirable isolation of the dynamoelectric machine if the above-mentioned protective schemes were used since a corresponding increase of potential across the total field winding does not occur.

Tests have shown and it is generally accepted that many synchronous dynamoelectric machines operate with field turns which are short circuited or with field turns which become short circuited when the turn-to-turn voltages increase above normal. Furthermore, other dissymmetries such as unequal air gaps and the like may cause undesirable operation of the prior art protective schemes. Consequently, for such applications, these prior art protective schemes are unsatisfactory since the protective system may operate on external faults even though no internal faults on the armature or stator winding of the synchronous dynamoelectric machine exist.

Accordingly, it is an object of my invention to provide a new and improved protective system for dynamoelectric machines whereby isolation of the dynamoelectric machine is obtained upon internal faults without false operation in the event of external faults.

It is another object of my invention to provide a new and improved protective system for internal faults of dynamoelectric machines which will operate to isolate the dynamoelectric machine with more consistent speed of operation than was heretofore possible.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which the single figure thereof diagrammatically illustrates a protective arrangement embodying my invention.

Referring now to the drawing, I have shown, for the purpose of illustrating my invention, a dynamoelectric machine 10 having two relatively movable windings 11 and 12 which form respectively the armature and field windings of a synchronous machine, such as a generator, motor, or synchronous condenser. Since the armature winding 11 of a synchronous dynamoelectric machine is normally the stator winding energized from a high-voltage source of alternating current, I have illustrated this winding as energized from a suitable bus 13 through a circuit-controlling means, such as circuit interrupter 14, which is illustrated as of the latched closed type provided with a trip coil 15 and an "a" switch 16 which is closed when the circuit breaker is closed and open when the circuit breaker is open. It should be understood that, in so far as my invention is concerned, it is immaterial which of the windings 11 and 12 is the rotor or stator winding but, since the more usual case is the one in which the armature is the stator, I have illustrated the field winding 12 as the moving winding or rotor and it is accordingly provided with the necessary slip rings 17 and 18 which are connected to a suitable exciter unit 19 through a latched closed circuit breaker 21 having a trip coil 22 and an "a" switch 23. It should be understood that the field winding 12 may involve any number of poles such as are commonly used in synchronous dynamoelectric machines and, for the purpose of illustration, the field winding 12 has been shown as subdivided into four sections to indicate a field winding having four poles.

In order to indicate the presence of an internal fault on the armature or stator winding 11 which fault in many cases is not discernible by the usual method of differential protection, I provide, as in the above-mentioned Merrick patents, a third slip ring 24. Although I have disclosed the slip ring 24 as connected to the midpoint 25 of the field winding 12 to obtain certain advantages enumerated hereinafter, it should be understood that my invention is not limited to using exactly one-half of the winding but any other predetermined portion of the winding might be utilized. However, by connecting slip ring 24 to the midpoint 25 of the field winding 12, as illustrated, rather than to include only a small portion of the field winding between slip rings 17 and 24, a more consistent speed of operation of the protective system may be obtained since the potential across slip rings 17 and 24 will be more or less independent of the relative location of the internal fault with respect to the tapped winding section as contrasted with arrangements where only a small portion of the field winding is connected between these slip rings.

In order to isolate dynamoelectric machine 10 upon the occurrence of an internal fault in armature winding 11, for example, I provide an electroresponsive device generally indicated at 26 which is arranged to operate a contact-controlling member 27 for bridging contacts 28 to energize the trip coils 15 and 22 of circuit breakers 14 and 21, respectively. Electroresponsive device 26 may comprise any of the well-known types of relays although I have preferred to illustrate it as of the induction disk type having a plurality of disks 29 and 30 mounted on a common shaft 31 for controlling contact-controlling member 27 which is normally biased to the open position indicated in the drawing by spring means 32.

In order that electroresponsive device 26 is responsive to internal faults on the armature winding 11 of dynamoelectric machine 10, an operating torque is applied to shaft 31 to cause rotation thereof in the direction indicated by the arrow associated with disk 29. This is accomplished by means of a motor element 34 associated with disk 29 which is energized with a potential obtained across slip rings 17 and 24 through a potential transformer 35 which is provided with an air gap so that energization of motor element 34 may be obtained in response to the induced alternating current in field winding 12 without appreciably saturating the core thereof by the direct current flowing in the field winding. In order to balance the small component of direct current normally flowing in the primary winding 36 of potential transformer 35, a variable impedance, such as adjustable resistor 37, may be connected across slip rings 18 and 24. By properly adjusting this resistance, no unbalance in the normal energization of the two halves of field winding 12 will result by virtue of the energization of motor element 34 associated with induction disk 29. It should be understood, however, that in large dynamoelectric machines, such a balancing impedance 37 may not be required in view of the fact that the unbalanced current due to the energization of primary winding 36 of potential transformer 35 may be a negligible portion of the induced alternating field current flowing in field winding 12.

In order to prevent motor element 34 from causing contact-controlling member 27 to bridge contacts 28 on a fault condition external of dynamoelectric machine 10 when a dissymmetry such as a shorted field winding turn, for example, causes a high torque to be produced on disk 29, I provide a restraining motor element 38 associated with disk 30 which produces a torque in the contact-opening direction as indicated by the arrow on disk 30. Motor element 38 is preferably energized in accordance with the induced alternating field current through a current transformer 39 provided with a suitable air gap so that motor element 38 is not appreciably affected by the direct-current component of the field current.

With the arrangement just described, the force for causing contact-controlling member 27 to bridge contacts 28 is proportional to the square of the induced alternating current voltage across half of the field winding 12 minus K times the square of the induced alternating field current minus a constant. This may be expressed mathematically as follows:

$$F = E^2 - KI^2 - K_1$$

where F is the contact-closing force or torque applied to shaft 31, E is the effective A. C. component of induced voltage appearing across one-half of the field winding or across slip rings 17 and 24 for producing the operating torque for electroresponsive device 26, I is the effective component of alternating field current for producing the restraining torque on electroresponsive device 26, K is a predetermined constant to allow for dissymmetry in the windings of the dynamoelectric machine as well as for a possible maximum number of shorted turns of the field winding, and $K_1$ is the restraining torque produced by the spring 32. For internal short circuits such as turn-to-turn faults of the armature winding 11 of dynamoelectric machine 10, a high operating torque will be obtained for motor element 34 while a small current restraint will be obtained for motor element 38. For external short circuits, on the other hand, the current restraint will be large, thus preventing operation even though the operating voltage is high enough to cause operation thereof without such restraint whereby a dissymmetry such as a shorted field turn combined with an external fault will not cause false operation of electroresponsive device 26 and undesirable operation of circuit breakers 14 and 21.

With the above arrangement, good relay sensitivity for internal faults is obtained since the ratio of voltage across half of the field winding to the current for either the fundamental or second harmonic, which are the predominant components of the induced alternating current and voltage, is one-half of the reactance of the field winding including the effect of mutual coupling of the armature circuit when connected to a system. This reactance has a relatively high ohmic value compared to the apparent reactance corresponding to the ratio of the alternating voltage and current viewed from electroresponsive device 26 due to dissymmetry such as shorted field turns combined with an external fault.

Accordingly, it is unnecessary to use only a small portion of the field windings as in the prior art arrangements where ability to distinguish between external and internal faults could not be obtained otherwise. Also, by using half of the field winding for obtaining the operating potential of electroresponsive device 26, much faster operation of the protective system will consistently result since it is unnecessary for the machine to make substantially a full revolution before the shorted turn or internal fault in the armature winding 11 becomes effective as might be the case for a particular fault location when only a very small portion of the field winding is tapped to obtain an operating potential therefrom for an electroresponsive device, such as 26.

The operation of the protective system will be obvious in view of the detailed description included above. In the event of an internal fault, such as a turn-to-turn fault, on armature winding 11, a high alternating-current voltage will be induced in a small part of the field winding as each small part of the field winding passes the shorted turn of the armature winding 11. Since the operating potential for electroresponsive device 36 is obtained across half of the field winding 12, the high alternating-current voltage appearing across this half of the field winding due to a fault on armature winding 11 will be independent of the internal fault location. This is due to the fact that the resultant alernating-current voltage across the total field winding under all conditions is substantially zero due to the negligible impedance of the exciter and, consequently, the voltages appearing across the two halves of field winding 12 are essentially equal. Therefore it is immaterial whether the small part of the field winding in which the high voltage is induced as it passes the faulted portion of the armature winding is in the half of the field winding between slip rings 17 and 24 or between slip rings 24 and 18. Under such an internal wault condition, the restraining torque produced by motor element 38 will be very low, and consequently, the operating torque produced by motor 34 will predominate and contacts 28 will be bridged with the consequent opening of circuit breakers 14 and 21. In the event of an external fault, the induced alternating-current component of the field winding 12 will be high to provide a high restraining torque for electroresponsive device 26 and prevent false operation thereof even though a dissymmetry, such as a shorted field turn, might cause motor 34 to produce a high operating torque on electro-responsive device 36.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination with a synchronous dynamoelectric machine having relatively movable field and armature windings, an electroresponsive device including means for causing operation thereof in response to a turn-to-turn fault on said armature winding connected to be energized in accordance with the alternating potential appearing across a predetermined portion of said field winding, restraining means for said electroresponsive device, and means for energizing said restraining means from said dynamoelectric machine to prevent faulty operation of said electroresponsive device under substantially all external fault conditions even though dissymmetries exist in said dynamoelectric machine.

2. In combination with a dynamoelectric machine having relatively movable field and armature windings, means for controlling the circuit of one of said windings operative in response to a turn-to-turn fault on said armature winding including operating means energized in accordance with the alternating potential appearing across a predetermined portion of said field winding, and restraining means energized only with the induced alternating-current flowing in said field winding.

3. In combination with a synchronous dynamoelectric machine having relatively movable field and armature windings and means for controlling the circuit of the armature winding on the occurrence of a turn-to-turn fault thereon including a circuit interrupter, an electroresponsive device for controlling the operation of said circuit interrupter comprising a movable member, a pair of motor elements for producing opposed torques on said movable element, means for energizing one of said motor elements in accordance with the alternating potential appearing across a predetermined portion of said field winding, and means for energizing said other motor element only in accordance with the induced alternating current flowing in said field winding.

4. In combination with an alternating-current circuit, a synchronous dynamoelectric machine having relatively movable field and armature windings, means including an electric circuit interrupter for interconnecting said alternating-current circuit and said armature winding, a source of direct-current potential for energizing said field winding, a midtap on said field winding, an electroresponsive device for controlling said circuit interrupter including a movable member, a motor element for causing an operating torque to be applied to said movable member, means for energizing said motor element with the alternating potential appearing across the midtap and one of the terminals of said field winding so as to isolate said armature of said dynamoelectric machine from said alternating current circuit upon the occurrence of a turn-to-turn fault on said armature winding, and means responsive to the induced alternating current flowing in said field winding for preventing faulty operation of said electroresponsive device under substantially all external fault conditions.

5. In a system for protecting against turn-to-turn faults on the armature windings of synchronous dynamoelectric machines having relatively movable field and armature windings, an electroresponsive device having a plurality of windings, means for energizing one of said windings of said electroresponsive device in accordance with the alternating potential appearing across one-half of said field winding of said dynamoelectric machine, and means for energizing said other winding of said electroresponsive device in response to the induced alternating-current flowing through said field winding to prevent faulty operation of said electroresponsive device by virtue of dissymmetries existing in said dynamoelectric machine coupled with an external fault condition.

6. In combination with an alternating-current circuit, a synchronous dynamoelectric machine having a stator winding and a movable field winding, a plurality of slip rings for said field winding connected to the terminals thereof, a third slip ring connected to an intermediate point on said field winding, means including an electric circuit interrupter for interconnecting said alternating-current circuit and said stator winding, an electroresponsive device including a movable circuit-controlling member for controlling the operation of said circuit interrupter, a first motor element for causing operation of said circuit-controlling member, a winding for said motor element, means for energizing said winding with the alternating potential appearing across said third slip ring and one of said other slip rings associated with said field winding, a second motor element for restraining the operation of said circuit-controlling member having a winding, and means for energizing said last-mentioned winding solely in accordance with the alternating current induced in said field winding so as to prevent operation of said electroresponsive device under external fault conditions.

7. In combination with a synchronous dynamoelectric machine having relatively movable field and armature windings, an electroresponsive device including means for causing operation thereof in response to a turn-to-turn fault on said armature winding, means for energizing said electroresponsive device with the alternating potential appearing across one-half of said field winding so as to cause operation of said electroresponsive device by virtue of the relatively high potential induced in said field winding upon the occurrence of a fault on said armature winding, restraining means for said electroresponsive device, and means for energizing said electroresponsive device from said dynamoelectric machine to prevent dissymmetries in said dynamoelectric machine from causing faulty operation thereof under substantially all external fault conditions.

8. In combination with a synchronous dynamoelectric machine having relatively movable field and armature windings, an electroresponsive device including means for causing operation thereof in response to a turn-to-turn fault on said armature winding, means for energizing said electroresponsive device with the alternating potential appearing across one-half of said field winding so as to cause operation of said electroresponsive device by virtue of the relatively high potential induced in said field winding upon the occurrence of a fault on said armature winding, restraining means for said electroresponsive device, means for energizing said restraining means in response to the alternating current flowing in said field winding for preventing faulty operation of said electroresponsive device under substantially all external fault conditions by virtue of dissymmetries in said dynamoelectric machine, and means for preventing the direct-current quantities of said field winding from substantially affecting the operation of said electroresponsive device.

SELDEN B. CRARY.